United States Patent
Illman

[15] 3,634,972
[45] Jan. 18, 1972

[54] SPLICE AND METHOD OF FORMING A SPLICE

[72] Inventor: Walter F. Illman, Greensboro, N.C.
[73] Assignee: Burlington Industries, Inc., Greensboro, N.C.
[22] Filed: Mar. 31, 1970
[21] Appl. No.: 24,067

[52] U.S. Cl. .................................................57/142, 57/159
[51] Int. Cl. ....................D02g 3/22, B65h 69/06, B65h 69/04
[58] Field of Search..................57/22, 23, 142, 159, 140 G; 156/148, 157, 158, 159

[56] References Cited

UNITED STATES PATENTS

| | | | |
|---|---|---|---|
| 2,703,300 | 3/1955 | Koon | 156/148 X |
| 3,395,529 | 8/1968 | Ray | 57/140 UX |
| 3,498,038 | 3/1970 | Shulver | 57/140 X |
| 3,526,085 | 9/1970 | Illman | 57/159 X |
| 3,183,658 | 5/1965 | Peterson | 57/142 X |
| 2,605,603 | 8/1952 | Willis | 57/142 |

FOREIGN PATENTS OR APPLICATIONS 824,742  12/1959  Great Britain........................57/159

*Primary Examiner*—Donald E. Watkins
*Attorney*—Cushman, Darby & Cushman

[57] ABSTRACT

A method for splicing together the ends of glass yarns, especially tire cords composed of fiberglass, that have been previously coated with a synthetic polymer latex to render them compatible with synthetic rubber, consisting of helically wrapping together the respective ends to be spliced with a wrapping material compatible with both the synthetic polymer latex and synthetic rubber, compressing and holding the yarns or cords to be spliced or joined. The wrapping material may be a heat stable substance, an elastomeric polymer, or a thermosensitive nylon or polyester fiber.

29 Claims, 3 Drawing Figures

INVENTOR
WALTER F. ILLMAN

BY Cushman, Darby & Cushman
ATTORNEYS

SPLICE AND METHOD OF FORMING A SPLICE

BACKGROUND OF THE INVENTION

The present invention relates to an improved splice for glass tire cord or like yarns and to a method for making the same, and more particularly to a method for joining coated glass fibers for use as a tire cord.

In the manufacture of fiberglass embedded tires and other synthetic rubber articles, it is necessary that successive glass yarns or cords be joined together in order that the cord may be uninterruptedly placed within the casing of rubber. Should a break occur in the cord or yarn to be incorporated or if one supply package of the cord or yarn is exhausted, then a succeeding supply package must be joined to the end of the exhausted package by joining the two free ends of the yarn or cord. An interruption in the supply of glass cord often requires stopping the apparatus which is processing the glass cord, a costly expense to be avoided.

Present methods of joining two ends of a glass cord or yarn as it is commonly known in the art are limited due to the very nature of the cord itself. Knotting the two strands together, an expedient used in the textile industry, is not suitable for glass cords due to the fragility of the cord; it is incapable of being knotted. Another method of joining two ends of a yarn is binding them together with a third thread or wrap thus producing a splice in the yarn. The following patents disclose machines for splicing two yarns together: 1,098,308, 1,133,830, 1,950,658, 2,279,299, 2,765,033, and my copending application Ser. No. 783,470, now Pat. No. 3,504,488.

Splicing continuous filament glass yarns, using conventional equipment as disclosed above, results in objectionable end slippage of the yarn. Most conventional splicing machines are designed for staple yarns in which the wrapper thread can embed itself at the junction area to produce an effective splice. In addition, staple yarns may be easily compressed by the wrapper. Inorganic cords, particularly fiberglass, are not compressed to an appreciable extent by a tightly wound wrapping material.

Another method of joining yarns and particularly fine glass fibers is the use of a solvent-softenable resin material continuous with the overlap of the yarn. The resin material is softened with a quick evaporating solvent thereby coalescing the resin to form a splice. This method, as disclosed in U.S. Pat. No. 3,070,947, requires the use of an expensive solvent-softenable resin material to wrap the yarn and a rapidly evaporating solvent to soften this resin. The inherent volatility of the solvent makes it difficult to apply to the splice area. The resulting spliced yarn would not as such be suitable to incorporate with synthetic rubber compounds, due to the resistance of the splicing material to rubber compounding, and the creation of potential gas pockets during embedding in rubber with the use of heat caused by the residual solvent material.

SUMMARY OF THE INVENTION

The present invention embraces a method of forming a splice between cord, yarn or thread ends of fiberglass coated with a reactive synthetic polymer latex, the method involving helically wrapping the two glass ends together with a wrapping material compatible with both the reactive synthetic polymer latex coating and the rubber in which the splice is embedded and heating this wrapping so as to embed the wrap in the reactive synthetic polymer latex coating. The wrapping material compresses the coated glass cord together, and thus forms a strong splice fully compatible with encasement in synthetic rubber compounds. If a thermosensitive wrapping material is used, such as nylon or polyester filament, the wrapped area, upon exposure to heat shrinks, thereby fusing and securing the wrap to the reactive synthetic polymer latex of the coated yarn. The splice thus formed is helically bound so as to hold the yarn tails against the yarn and within said splice.

The ultimate application of the spliced fiberglass cords according to the invention is in polyester-fiberglass belted automobile tires, conveyor belts, and the like.

OBJECTS OF THE INVENTION

It is an object of this invention to provide a method of splicing the end portions of glass yarns or cords coated with a reactive synthetic polymer latex, notably a resorcinolformaldehyde-rubber latex composition, and arranged in an overlapping side-by-side relationship, by helically wrapping the cord ends to be spliced with a wrapping material that is fully compatible with the yarn coating and the material consisting essentially of rubber in which the spliced area is to be embedded, and heating the wrapped area thus resulting in a strong splice having the wrapping thread embedded in the reactive coating of the glass fiber.

Another object of the invention is to splice the end portions of glass yarns or cords coated with a reactive synthetic polymer latex, by wrapping a thermosensitive nylon or polyester fiber helically around the respective cord ends to be spliced.

Another object of the invention is to form a heat set splice that will avoid unwrapping and loosening of the spliced cord ends.

Another object is to wrap the cord or yarn ends with an elastomeric material, so that when the wrapping is applied under tension, the forces inherent in the stretched elastomeric material will cause the natural constrictive forces to compressively hold the material being wrapped.

Another object of the invention is to compress inorganic cord fibers coated with a reactive synthetic polymer latex together to form a tight, strong bond having a reduced tendency to slip apart.

Another object is to cause a temporary heat softening of the reactive synthetic polymer latex coating that will permit heat-shrunk fibrous materials of polyester or other drawn thermoplastic materials to compress and bind the fibers so they sink into and embed themselves into the synthetic polymer latex coating.

Another object is to produce a splice in coated fiberglass thread, yarn and cord that is fully compatible with synthetic rubber encasement.

Another object of the invention is to provide a method of splicing fiberglass yarns, threads, cords or strands providing high strength smooth splices of a uniform size and character having filament and fiber ends tucked in.

Another object is to provide a method of splicing fiberglass yarns, threads and cords having filament and fiber ends tucked in without the need for separate clipping and overwrapping operations.

DETAILED DESCRIPTION OF THE INVENTION

These and other objects and advantages of the present invention will appear more fully in the following specification, claims and drawings in which:

While the method of splicing fiberglass cords, yarns and the like coated with a composition so as to make the fiberglass more compatible with rubber and synthetic rubber products, this method is also suitable for splicing cords of certain inorganic materials such as fiberglass, quartz glass, boron and carbon yarn coated for different applications, so long as the coating at least partially yields to its compressive wrapping and is fully compatible therewith.

Figure 1:
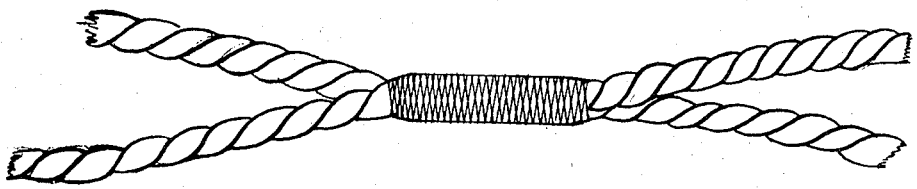
FIG. 1 is a fragmentary view of a splice made according to the invention prior to clipping the tails from the ends of the cord and heat treatment.

Referring to the drawings in detail, FIG. 1 shows the ends of two crossed fibers after they have been bound together with the thermosensitive wrap but before trimming of the ends and heating.

Figure 2:
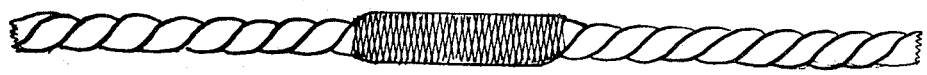
FIG. 2 is a view of the completed splice after heat treatment and the removal of tails from the splice.

FIG. 2 is the completed splice following heat treatment and shrinkage.

Figure 3:
FIG. 3 is a view of the completed splice in which both cord ends have been overwrapped with wrapping material.

FIG. 3 is the completed splice made without first clipping the unwrapped ends prior to overwrapping. Cord ends are placed together in parallel side-by-side relationship, the length of cord overlap being less than the overall length of the splice. The wrapping material is then applied covering and securing both ends of the wrapped cords.

Cords used according to the invention are inorganic in composition. Examples of such cords are fiberglass, carbon, graphite, boron, and quartz glass yarns. The preferred cord or yarn is fiberglass because of its availability, relative cost and consumer acceptance. It has long been a practice to reinforce rubber articles that are subject to wear stress and pressure with textile cords. Early cords were made of cotton, and more recently of synthetic fibers. Fiberglass has been used for its low-heat conductivity with respect to its relative strength and weight. By itself, fiberglass is incompatible with synthetic rubber and must first be treated with a composition that renders it suitable for incorporation into the rubber. Such compositions are highly reactive and permit bonds to form between the fiberglass and the rubber.

Most commonly used coating materials are described as being of the synthetic polymer latex type. The preferred composition is a resorcinolformaldehyde latex, hereinafter called "RFL." Representative of such compositions suitable for use herein are those described in patents issued to E. C. Atwell, via: 3,060,070 and 3,060,078 which describe resorcinolformaldehyde and neoprene latex; 3,030,230 using styrene-butadiene copolymer and/or styrene-butadiene-vinylpyridine terpolymer lactates as shown in 3,240,650; bonding polyethylene terephthalate to various synthetic rubbers as in 3,060,078, 3,240,649, 3,240,650, 3,240,659; and bonding linear polyamide fibers to various synthetic rubbers as described in U.S. Pat. Nos. 3,060,070, 3,240,651 and 3,240,660.

A preferred resorcinolformaldehyde latex composition for coating the inorganic cords used herein may be described as aqueous, desirably organic solvent-free, alkaline mixture of partially condensed resorcinolformaldehyde reaction product and a synthetic rubber latex having a ratio of reaction product to latex solids of 1:12 to about 1:2.5.

Yarn is a term of common use in the textile industry; in its generic sense it includes monofilaments, multifilaments, cords and threads. Fiberglass is available in several forms including bulk rolls and producer supplied yarn, either coated or uncoated. The two ends of the inorganic fibrous material, hereinafter fiberglass cord, coated with RFL, to be spliced are crossed. Crossed yarn ends are then wrapped at their point of intersection, with a wrapping material compatible with the coating and synthetic rubber.

In order to produce an acceptable splice, the wrapping material employed must be compatible with both the coating of the yarn ends to be joined, and the material in which the yarn and splice are to be embedded. An elastomeric material of this nature is particularly attractive, due to the inherent nature of the wrap when stretched. When an elastomeric material is applied under tension, the natural constrictive forces therein tend to compress and hold the yarn ends together. Suitable elastomers are natural rubber, polyurethanes and spandex. Other suitable elastomers are styrene-butadiene copolymers, styrene-butadiene rubber (SBR rubber), and ethylene-propylene nonconjugate diene terpolymers, such as ethylene-propylene-dicycloxentadiene, polybutadiene and poly cis isoprene. Other wrapping materials such as Nomex, a heat-stable wrapper are, of course, acceptable.

Any synthetic textile material that is sensitive to and is reduced to size and fused by heat as well as compatible with the reactive latex coating RFL is also suitable for displacement about the intersection of the two fiberglass end cords. It may be either in monofilament or multifilament form. However, the wrapping material should be of a relatively fine denier with respect to the denier of the fiberglass cord being wrapped in order to minimize the diameter of the resulting splice. The preferred denier of the wrapping material is from 5 to 70, and more preferably from 5 to 15.

Long chained synthetic polymers containing an ester of a dihydric alcohol and terephthalic acid, commonly known as polyesters, are suitable for wrapping the coated glass fibers. Examples are Dacron, a condensation polymer using ethylene glycol as the alcohol, Kodel, prepared from dimethyl terephthalate and 1,4-cyclohexanedimethanol according to U.S. Pat. No. 2,901,466 to Kibler et al. However, a preferred embodiment uses a nylon monofilament as described in U.S. Pat. No. 2,071,250 to W. H. Carothers. Other suitable forms of nylon are nylon 6, the lineal polymer obtained by the polymerization, of γ-caprolactam according to U.S. Pat. No. 2,241,321 to Schlack, and nylon 66, the polymer from adipic acid.

In the preferred embodiment, nylon or polyester, etc., wrapping material is wound about the intersection of the coated fiberglass cords from end-to-end in a helical manner, resulting in a continuous wrap from one end of the splice to the other. A preferred way of wrapping is to traverse the wrapping thread back and forth over itself in the same helical pattern. The length of this wrapping is dependent upon the strength of the splice desired and the limitations of the equipment with which the spliced cord is used. It will be apparent that the longer the splice the greater the surface area of the coated fiberglass cord held between the helical nylon wrap. The finished heat-set splice results in a strong encasement of the cord that permits the necessary flexing of the joint without objectionable stiffening of the ultimate textile thread or cord. The subsequent reapportionment of internal stress may be a factor should the fiberglass cord be subjected to extreme bending in the manufacturing process just prior to incorporation with the rubber. A third factor affecting the strength of the splice is the tension with which the helical wrap is applied to the coated fiberglass cords. The preferred apparatus for applying this wrap is disclosed in my copending application Ser. No. 783,470, now U.S. Pat. No. 3,504,448 (filed Dec. 13, 1968 as a continuation-in-part of Ser. No. 641,357 filed May 25, 1967, now abandoned) wherein a tension adjustment means is combined with the wrapping device. See also my copending application Ser. No. 750,664 filed June 6, 1968.

During the wrapping operation, it is desirable to trim the surplus ends of the fiberglass cord from the area of the splice to produce a clean, continuous cord. This may be accomplished in any convenient manner, but preferably as a step or steps in the wrapping procedure depending upon the nature of the wrapping apparatus used.

For example, according to one wrapping method, the cord ends to be joined are placed in a parallel side-by-side relationship from opposing directions. The central portion of the two parallel cords is helically wrapped with the selected wrapping material. The length of the splice area does not extend to the cord ends protruding from the splice. These cord ends are then clipped near the ends of the splice, and additional wrapping material is applied to hide the clipped ends.

In another method of splicing the two cord ends, the length of overlap of the two ends is much shorter than the above. When the cords are placed in a parallel side-by-side relationship from opposing directions, the length of overlap is shorter than the overall length of the completed splice. The wrapping material is next applied covering the overlapping area, then the respective ends of the cords are immediately overwrapped. Thus, the proper selection of the length of the cord ends to be spliced obviates the need for an additional clipping operation, and the overwrapping step can be incorporated into the normal wrapping of the splice. In this manner, potential loose ends are secured to the cords themselves and retained within the area of the splice.

After the wrapping and trimming operations are complete, the splice is exposed to a source of radiant energy or heat. This source is preferably located near the wrapping device for convenience and economy of movement. The source of radiant energy may be in the form of a heated post, tab or U-shaped heating element. Suitable heat may be provided by either combustion or electrical energy. The preferred embodiment is an electrically heated post surrounded on three sides by a covering that shields the operator and prevents the splice area from directly contacting the heated element. Following the wrapping operation, the nylon wrapped area is presented to but not contacted with the heated pole maintained at about 200° to 350° C. The temperature of the heated pole is dependent upon the nature and thickness of the nylon or polyester wrapping material selected, the thickness of the fiberglass cord, and the nature of the reactive latex coating thereon. Upon exposure to heat, several simultaneous events occur: the reactive synthetic polymer latex coating on the fiberglass cord is temporarily softened by the heat, the nylon wrapping material is reduced in size thereby causing a compression of the fiberglass cord within the nylon wrapping and embedding of the nylon wrapper into the heat-softened coating. Removal from the heated area results in a cooling of the splice as the fiberglass coating returns to its former state.

In another embodiment of the invention, the aforesaid elastomeric polymer compositions are used for the wrapping material. The elastomeric polymer composition, when disposed under tension about the cord ends, causes constrictive forces to be placed on the wrapped cords due to forces inherent in the stretched elastomeric material.

The scope of the invention is defined in the following claims wherein:

What is claimed is:

1. A method for splicing two ends of an inorganic yarn, coated with a synthetic polymer latex, comprising the steps of:
   a. crossing the yarn ends to be spliced
   b. wrapping the crossed yarn ends at their point of intersection with a wrapping material of relatively fine denier with respect to the denier of the material being wrapped,
   c. overwrapping said yarn ends with said wrapping material, and
   d. heating the wrapped area of the yarn.

2. The method according to claim 1, wherein said wrapping material is a thermosensitive, heat-shrinkable synthetic textile that compresses said yarn ends when exposed to heat.

3. The method according to claim 1, wherein said synthetic polymer latex is resorcinolformaldehyde latex.

4. The method according to claim 2, wherein said heat-shrinkable synthetic textile wrapping material is nylon.

5. The method according to claim 2, wherein said heat-shrinkable synthetic textile wrapping material is polyester.

6. The method according to claim 1, wherein said inorganic yarn is fiberglass.

7. The method according to claim 1, wherein said inorganic yarn is quartz glass or boron.

8. The method according to claim 1, wherein said inorganic yarn is carbon or graphite yarn.

9. A method according to claim 1, wherein said wrapping material has a denier of from 5 to 70.

10. A method of splicing fiberglass cord coated with resorcinolformaldehyde latex comprising the steps of:
    a. crossing the coated fiberglass cord ends,
    b. wrapping the crossed yarn ends at their point of intersection with nylon wrapping material of relatively fine denier with respect to the denier of the material being wrapped,
    c. overwrapping said yarn ends with said wrapping material, and
    d. heating said nylon wrapping to form a splice.

11. A yarn splice comprising:
    a. yarn ends of an inorganic yarn coated with a synthetic polymer latex arranged in overlapping side-by-side relationship,
    b. a wrapping material helically wound around and embedded in said coated yarn ends, said wrapping material compressing said yarn ends, and
    c. said splice exhibiting no free yarn ends.

12. A yarn splice comprising:
    a. yarn ends of an inorganic yarn coated with a synthetic polymer latex arranged in overlapping side-by-side relationship,
    b. a textile wrapping material helically wound around and embedded in said coated yarn ends, said wrapping material compressing said yarn ends, and
    c. said splice exhibiting no free yarn ends.

13. A yarn splice according to claim 11, wherein said synthetic polymer latex is resorcinolformaldehyde latex.

14. A yarn splice according to claim 11, wherein said inorganic yarn is fiberglass.

15. A yarn splice according to claim 12, wherein said synthetic polymer latex is resorcinolformaldehyde latex.

16. A yarn splice according to claim 12, wherein said textile wrapping material is nylon.

17. A yarn splice according to claim 12, wherein said textile wrapping material is polyester.

18. A yarn splice according to claim 12, wherein said inorganic yarn is fiberglass.

19. A yarn splice according to claim 11, wherein said inorganic yarn is selected from the group consisting of quartz glass, boron and other inorganic materials.

20. A yarn splice according to claim 11, wherein said inorganic yarn is carbon or graphite yarn.

21. A yarn splice comprising:
    a. yarn ends of fiberglass coated with a synthetic polymer latex arranged in overlapping side-by-side relationship,
    b. a thermosensitive heat-shrinkable nylon wrapping material helically wound around and embedded in said coated fiberglass, said nylon compressing said yarn ends,
    c. said splice exhibiting no free yarn ends.

22. A method for splicing two ends of an inorganic yarn, coated with synthetic polymer latex, comprising the steps of:
    a. crossing the yarn ends to be spliced,
    b. wrapping the crossed yarn ends at their point of intersection with a wrapping material of relatively fine denier with respect to the denier of the material being wrapped, while moving the crossed yarns in a first axial direction,
    c. cutting one free yarn end near the wrapped portion,
    d. moving the just wrapped portion in the opposite direction while continuing wrapping to cover the cut end,
    e. cutting the other free yarn end near the wrapped portion,
    f. moving the wrapped portion at least in the first mentioned axial direction while continuing wrapping to cover the other cut end,
    g. and removing the just formed splice from the wrapping area and breaking the tail of the wrapping material,
    h. heating said wrapped area of the yarn.

23. The method according to claim 22, wherein said wrapping material is a thermosensitive, heat-shrinkable synthetic textile that compresses said yarn ends when heated.

24. The method according to claim 22, wherein said synthetic polymer latex is resorcinolformaldehyde latex.

25. The method according to claim 23, wherein said heat-shrinkable synthetic textile wrapper is nylon.

26. The method according to claim 23, wherein said heat-shrinkable synthetic textile wrapping material is polyester.

27. The method according to claim 22, wherein said inorganic yarn is fiberglass.

28. The method according to claim 22, wherein said inorganic yarn is quartz glass or boron.

29. The method according to claim 22, wherein said inorganic yarn is carbon or graphite yarn.

* * * * *